Feb. 25, 1964 S. R. MASSOLL 3,121,902
CONCEALED WINDSHIELD WIPER MECHANISM
Filed Aug. 6, 1962 7 Sheets-Sheet 1

INVENTOR.
STANLEY R. MASSOLL
BY
W. E. Finch
HIS ATTORNEY

Feb. 25, 1964  S. R. MASSOLL  3,121,902
CONCEALED WINDSHIELD WIPER MECHANISM
Filed Aug. 6, 1962  7 Sheets-Sheet 6

INVENTOR.
STANLEY R. MASSOLL
BY
W. E. Finken
HIS ATTORNEY ically mounted retainers when the blades are parked adjacent their normal inboard stroke end positions, which retainers lift the wiper arm and blade assemblies over the lower windshield molding when the pivot rod is actuated to move the wiper blade and arm assemblies between their operating and stowed positions.

United States Patent Office 3,121,902
Patented Feb. 25, 1964

3,121,902
CONCEALED WINDSHIELD WIPER MECHANISM
Stanley R. Massoll, Detroit, Mich., assignor to General Motors Corporation, Detroit, Mich., a corporation of Delaware
Filed Aug. 6, 1962, Ser. No. 214,916
15 Claims. (Cl. 15—250.17)

This invention pertains to windshield clearing mechanism, and particularly to an improved wiper mechanism for vehicular windshields which is concealed when not in use.

Heretofore, it has been proposed to conceal the wiper arm and blade assemblies in a well located forwardly of the windshild when the windshield cleaning mechanism is not in use, and to close the well by means of a cover which is either slidably or pivotally supported in the vehicle. One of the problems attendant with prior art structures is that of preventing damage to the wiper blades as they are moved over the lower molding of the windshield when the wiping mechanism is activated and inactivated. Another problem associated with concealed wiper mechanisms having a forwardly hinged cover is that of the minimizing obstruction to vision when the cover is open and the wiper mechanism is activated, and yet provide adequate space to preclude interference between the cover and the wiper mechanism as it is moved from its operating position in contact with the windshield to its stowed position within the well, and vice versa. The present invention relates to a concealed windshield wiper mechanism wherein the wiper arm and blade assemblies are lifted over the lower windshield molding during movement of the mechanism between operating and stowed positions and wherein the cover is located in a partially closed position when the wiper mechanism is in its operating position.

Accordingly, among my objects are the provision of concealed windshield wiper mechanism including coordinated actuating means for operating the cover and moving the wiper mechanism between its stowed and operating positions; the further provision of concealed windshield wiper mechanism embodying a transversely extending, pivotally movable rod which carries the pivot shaft assemblies and operates the cover linkage; the further provision of windshield wiper mechanism including means for lifting the wiper arm and blade assemblies over the lower windshield molding during movement between stowed and operating positions; and the still further provision of an improved linkage drive for a pair of spaced oscillatable windshield wiper blade and arm assemblies including two-part rods, or links, the two parts being connected for conjoint reciprocation but capable of rotation relative to each other.

The aforementioned and other objects are accomplished in the present invention by utilizing a cover actuating linkage which positions the cover in its fully open position during movement of the wiper mechanism between its operating and stowed positions, moves the cover to its fully closed position when the wiper mechanism is stowed in the well, and retains the cover in a partially open position when the wiper mechanism is in its operating position with the wiper blades in engagement with the windshield. In the specific embodiment disclosed, separate motors are provided for actuating the transverse pivot rod and imparting conjoint oscillation to a pair of wiper blades in phase opposition across the surface of the windshield. The energizing circuits for the motors are interlocked so as to preclude operation of the wiper motor when the cover is fully closed, and likewise preclude operation of the pivot rod motor when the wiper motor is operating. The wiper arms engage with a pair of pivotally mounted retainers when the blades are parked adjacent Further objects and advantages of the present invention will be apparent from the following description, reference being had to the accompanying drawings, wherein a preferred embodiment of the present invention is clearly shown and wherein similar numerals depict similar views throughout the several views.

In the drawings:

FIGURE 4 is a fragmentary sectional view taken along line 4—4 of FIGURE 3a depicting the three positions of the cover.

FIGURE 5 is a fragmentary sectional view taken along line 5—5 of FIGURE 3a.

FIGURE 9 is a fragmentary sectional view taken along line 9—9 of FIGURE 3a.

FIGURE 10 is a view similar to FIGURE 9 showing the cover fully open and a wiper arm retainer in its intermediate position.

Figures 1, 2:
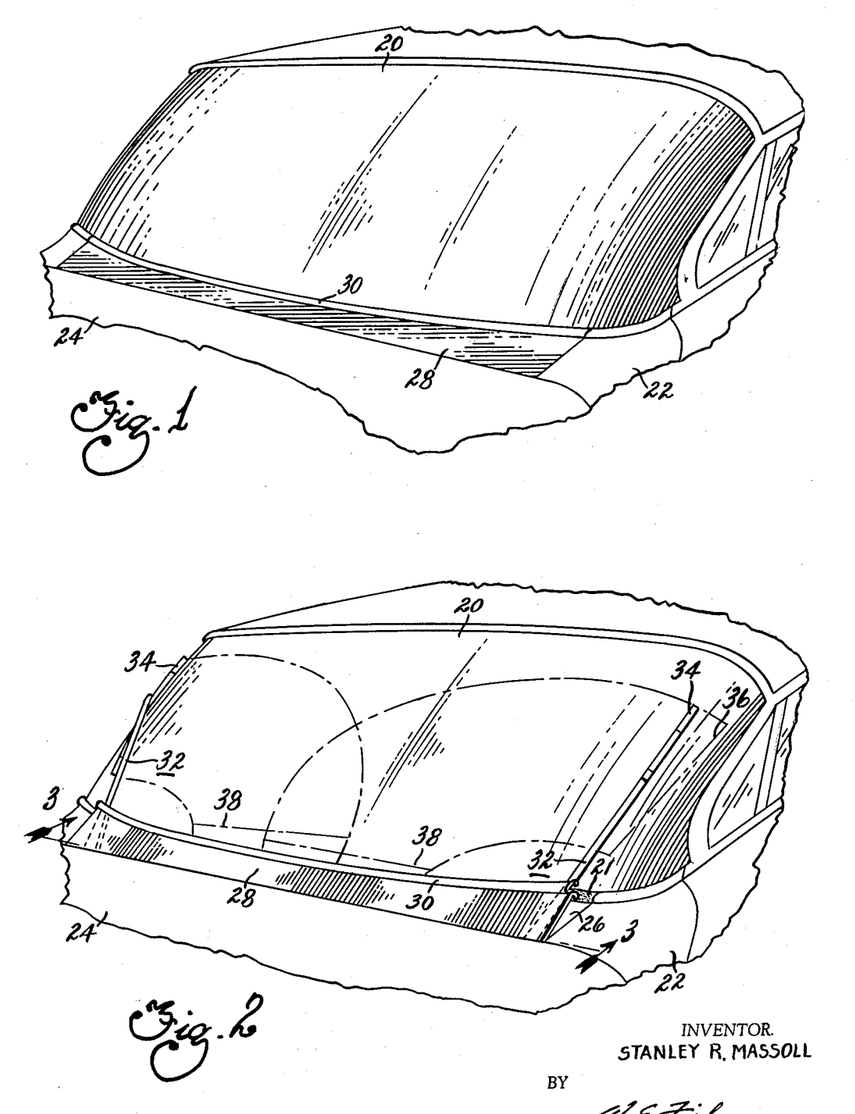
FIGURE 1 is a fragmentary perspective view of a vehicle equipped with the improved concealed windshield cleaning mechanism with the cover fully closed.
FIGURE 2 is a view similar to FIGURE 1 with the cover partially closed with the wiper blade and arm assemblies in their operating position in engagement with the windshield.

With reference to FIGURES 1 and 2, a vehicle is shown having a windshield 20, a forwardly extending cowl structure 22 and a hood 24. The cowl 22 has an elongated transversely extending opening 26 therein which, as shown in FIGURE 1, is closed by a cover 28 hinged along its forward edge. The cover carries a lower reveal molding section 30 and, if desired, may take the form of a louvered grille through which air flows for ventilating the passenger compartment of the vehicle.

As seen in FIGURE 1, when the cover 28 is closed the windshield cleaning mechanism comprising a pair of oscillatable cleaner assemblies is completely concealed from view. The cover 28 is shown in its partially closed, or operating, position in FIGURE 2 with spaced wiper arms 32 extending through the opening 26 in the cowl and carrying wiper blades 34 which engage the outer surface of the windshield 20. In accordance with conventional practice the wiper arms 32 comprise spring hinged inner and outer sections so as to maintain the wiper blades 34 engageable with the outer surfaces of the windshield 20 under the required pressure. As shown, the wiper blades 34 are oscillated conjointly in phase opposition throughout paths which overlap in the central portion of the windshield, the wiper blades 34 being oscillatable throughout running strokes having outboard stroke end limits 36 and inboard stroke end limits 38, whereat the wiper blades engage each other in over-lapping fashion and are arranged in substantially horizontal positions.

Figure 3A:
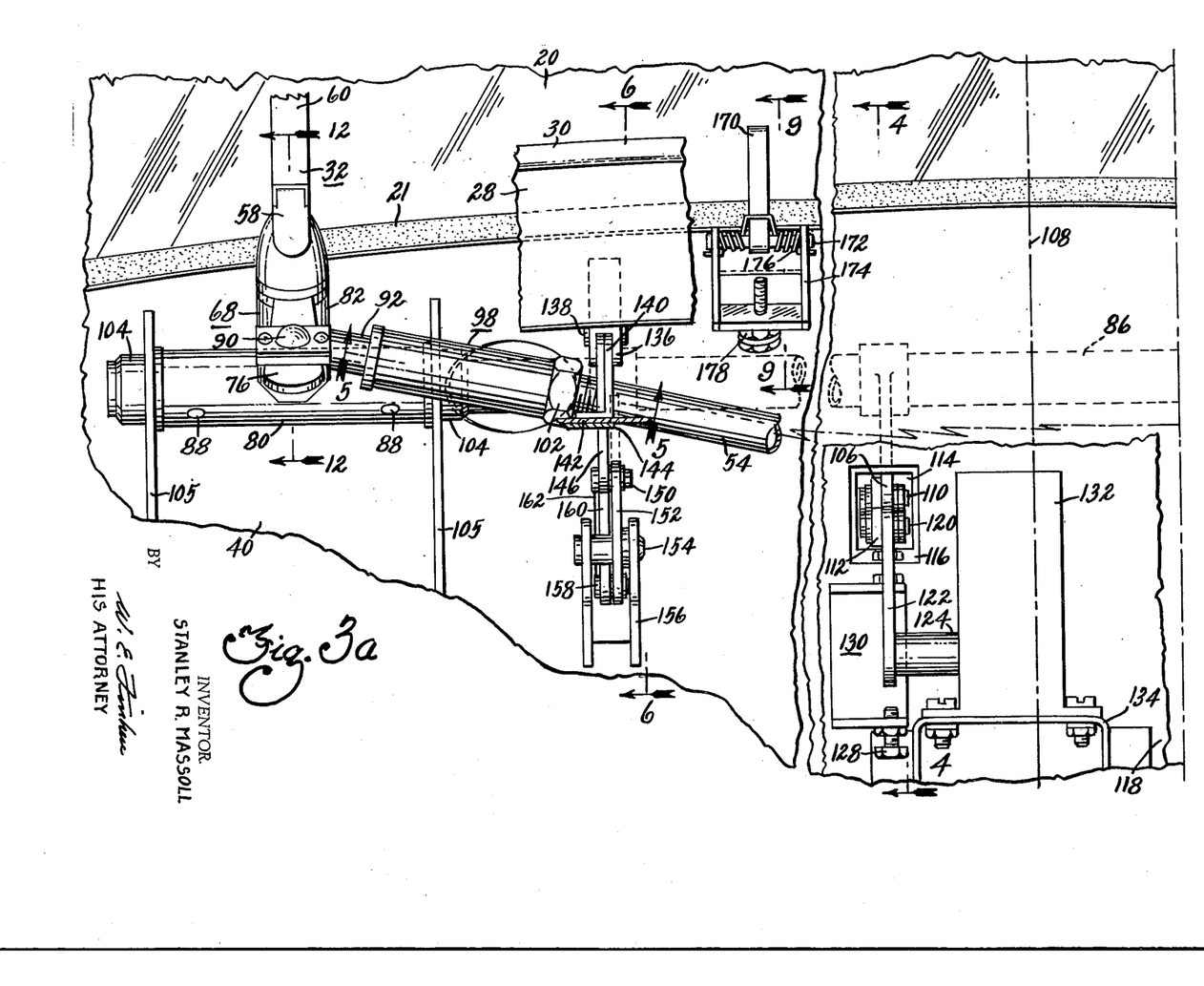
FIGURES 3a and 3b comprises a composite enlarged fragmentary view, partly in section and partly in elevation, with certain parts broken away, taken generally along line 3—3 of FIGURE 2.
Figure 3B:
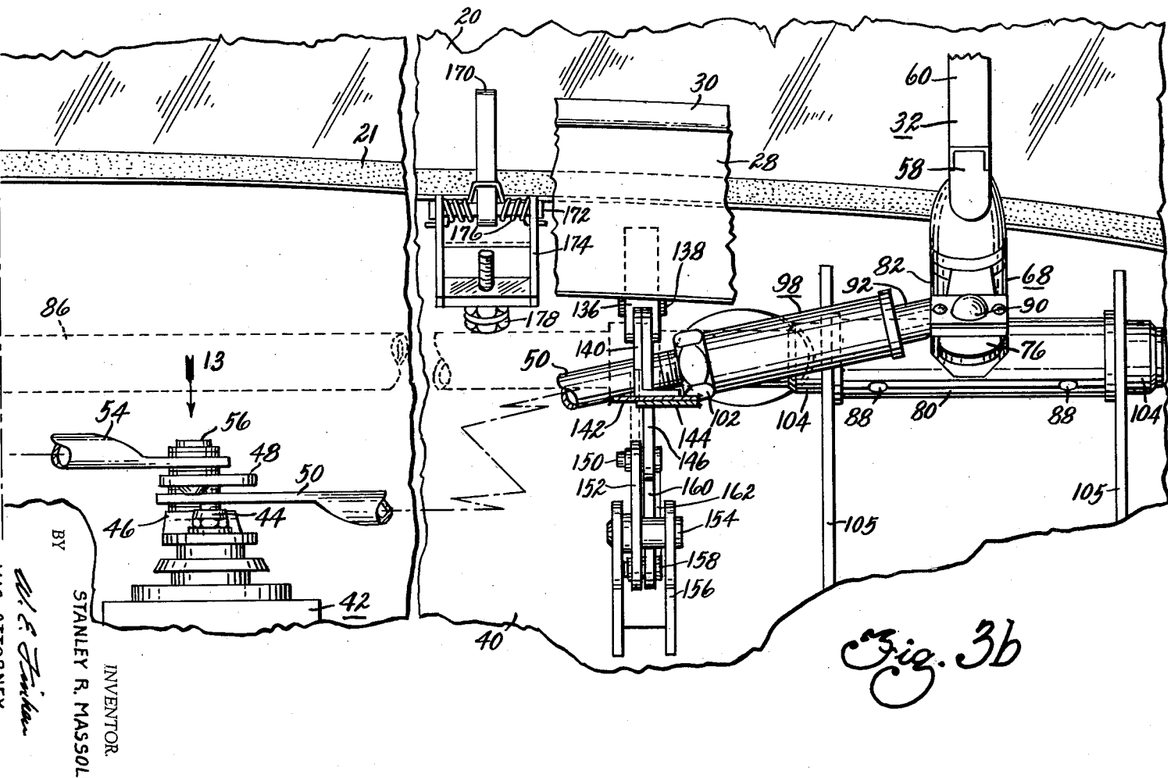

Referring to FIGURES 3a and 3b, the component parts of the wiper actuating mechanism and the cover actuating mechanism are disposed within a well 40 beneath the cover, or cowl panel, 28. The wiper mechanism includes a crank assembly driven by an electric motor 42 comprising a substantially vertically arranged rotary output shaft 44 having a first crank arm 46 attached thereto, and a second crank arm 48 attached to the outer end of crank arm 46 and angularly offset with respect thereto, as more clearly shown in FIGURE 13. The crank arms 46 and 48 constitute a double ended crank assembly. The inner end of a tubular transmission link 50 is pivotally connected by a pin 52 to the interconnected ends of crank arms 46 and 48, and the inner end of a second tubular transmission link 54 is pivotally connected to the free end of crank arm 48 by a pin 56. During rotation of the double throw crank assembly about the axis of shaft 44 reciprocating, or to and fro, movement will be imparted to the links 50 and 54.

Figures 12, 13:
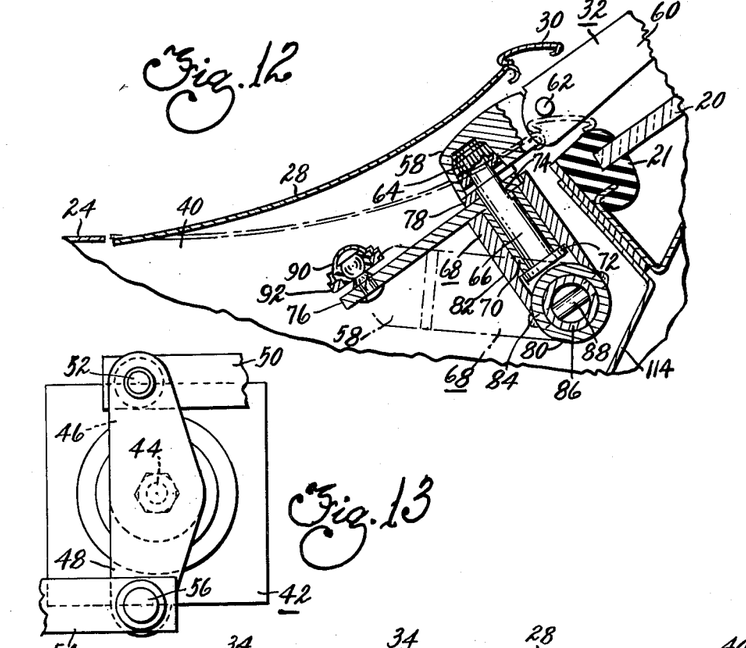
FIGURE 12 is a fragmentary sectional view taken along line 12—12 of FIGURE 3a depicting the two positions of the wiper mechanism.
FIGURE 13 is a fragmentary view in elevation taken in the direction of arrow 13 of FIGURE 3b.

As shown in FIGURE 12, each wiper arm 32 comprises a mounting section 58 and a blade carrying section 60 pivotally connected to the mounting section by a transversely extending pin 62 for movement towards and away from the windshield 20. The arm section 60 is biased towards the windshield 20 by an extension spring, not shown. The mounting section 58 is drivingly connected to a burr, or spindle, 64 attached to an oscillatable pivot shaft 66. Each pivot shaft 66 is journalled in a housing 68 by a sleeve bearing 70. The inner end of each pivot shaft is flanged, or headed, at 72 to abut the inner end of the sleeve bearing 70 and prevent axial outward movement of the pivot shaft. In addition, each pivot shaft 66 is formed with a flat 74 which is disposed in a complementary aperture of a drive arm 76. A C-shaped spacer 78 is inserted between the spindle 64 and the drive arm 76.

The housings 68 comprise a transversely arranged tubular section 80 to which a radially extending tubular section 82 is attached by welding at 84 after assembly of the pivot shaft 66 and sleeve bearing 70 therein. An elongate, transversely extending hollow pivot rod 86 extends through the tubular portions 80 of the two housings 68. The housings 68 are connected to end portions of the pivot rod 86 for movement therewith by cross pins 88. Only the end portions of the pivot rod 86 are disposed in the well 40 as clearly seen in FIGURES 3a and 3b.

Figures 4, 5:
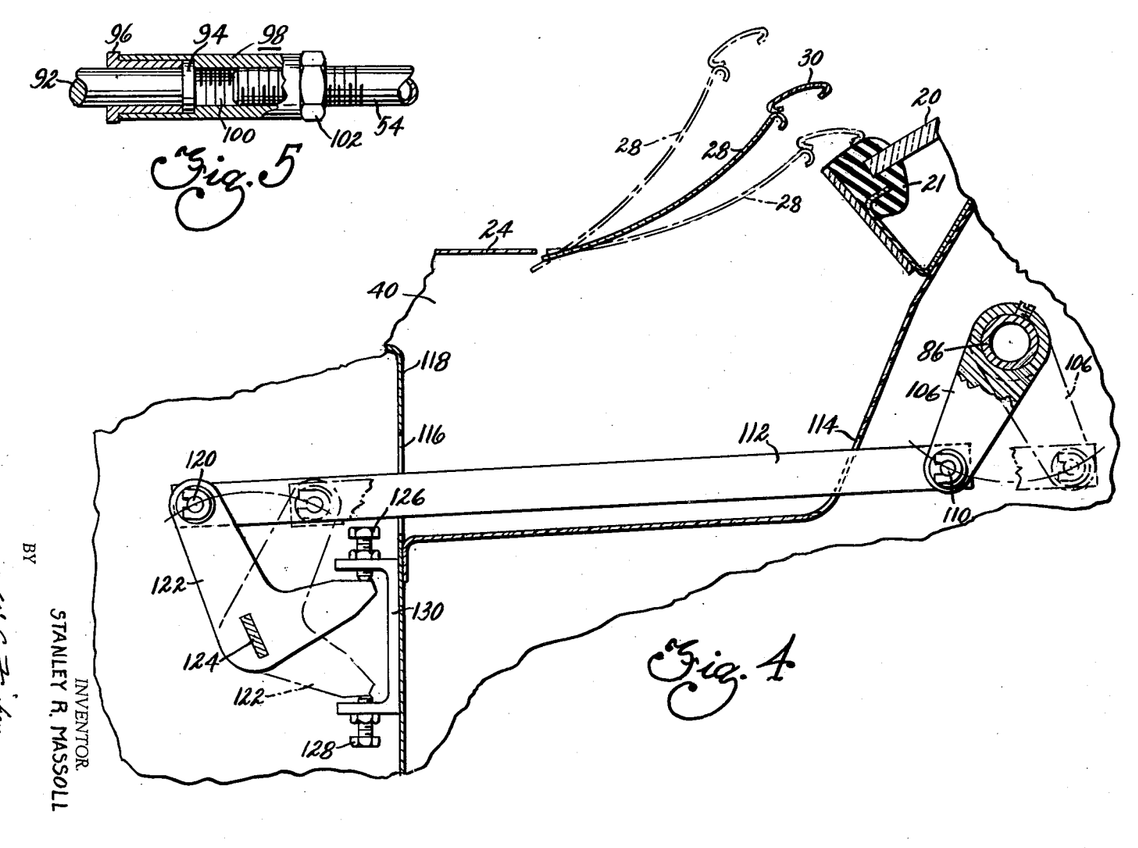

The outer end of each drive arm 76 is connected through a ball and socket joint 90 with the flattened end of a rod 92. As seen in FIGURE 5, each rod 92 has a headed inner end 94 journalled by a bearing 96 press-fitted in a sleeve 98. The sleeve 98 has an internally threaded bore 100 for receiving the threaded outer end of its respective tubular transmission link 50 or 54. After each transmission linkage to the left and right hand pivot shaft assembly is adjusted to its proper length by rotation of the sleeves 98 relative to its respective transmission link, each sleeve connection is secured by an external jam nut 102. It will be appreciated that the sleeve connections between the two parts of the transmission links will permit the link parts 92 to rotate relative to their respective links 50 and 54, while constraining the two parts to move in unison upon reciprocation of the links 50 and 54. The purpose of the rotating joint in the transmission linkage assemblies will be pointed out more particularly hereinafter.

Each end of the transversely extending pivot rod 86 is rotatably supported by a pair of spaced bearings 104 carried by brackets 105 which are attached to the vehicle, and disposed at the ends of the housings 68. As seen in FIGURE 4, the pivot rod 86 has a crank arm 106 attached thereto on one side of the center line 108 of the vehicle as seen in FIGURE 3a. The outer end of the crank arm 106 is pivotally connected at 110 to a link 112 which extends through a side wall opening 114 in the well, or plenum chamber, 40 and through an opening 116 in the vehicle firewall 118. The link 112 is pivotally connected at 120 to one end of a bellcrank 122 attached to a drive shaft 124. The bellcrank 122 is movable between the full and dotted line positions shown in FIGURE 4 as determined by adjustable stop screws 126 and 128 mounted on a bracket 130 attached to the firewall 118 on the engine compartment side thereof.

The shaft 124, as shown in FIGURE 3a, is driven by a reversible electric motor 132 mounted on a bracket 134 supported on the vehicle firewall 118. The linkage comprising bellcrank 122, link 112 and the crank arm 106 imparts pivotal movement to the rod 86 throughout an angle of substantially 50° between the full and dotted line positions as shown in FIGURE 4.

Figures 6, 7:
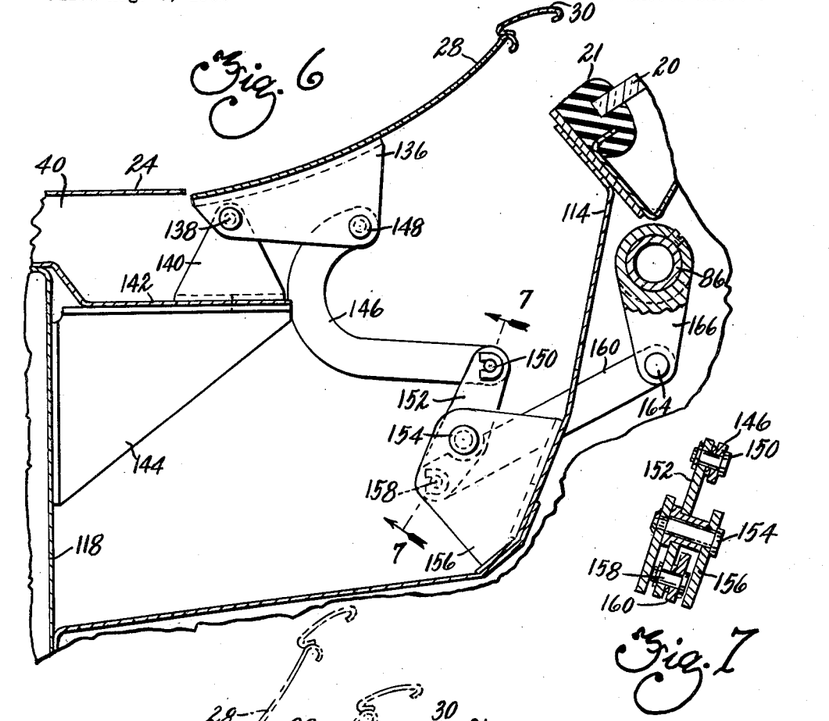
FIGURE 6 is a fragmentary sectional view taken along line 6—6 of FIGURE 3a showing the cover in its partially closed position.
FIGURE 7 is a sectional view taken along line 7—7 of FIGURE 6.

Referring to FIGURES 3a, 3b and 6, the cover 28 has a pair of spaced U-shaped brackets 136 attached to its inner surface which are connected by substantially horizontally arranged hinge pins 138 to triangular brackets 140. The brackets 140 are attached to panels 142 supported by brackets 144 attached to the firewall 118. The cover actuating linkage comprises a pair of curved connecting links 146, of substantially J-shape, having their outer ends pivotally connected at 148 to their respective brackets 136 and their inner ends pivotally connected at 150 to bellcranks 152. Each bellcrank 152 has an intermediate pivotal connection at 154 to a stationary bracket 156, and the other end of each bellcrank 152 is pivotally connected at 158 to a link 160, the links 160 extending through slots 162 in the back wall 114 of the well 40. The links 160 are pivotally connected at 164 to crank arms 166 attached to the pivot rod 86.

As seen more particularly in FIGURE 7, the brackets 156 are U-shaped and each bellcrank 152 is disposed between the legs of its respective bracket 156. The base of each bracket 140, each panel 142 and the horizontal leg of each bracket 144 have aligned slots 168 for receiving the curved portion of the link 146 during pivotal movement of the cover 28.

Figure 8:
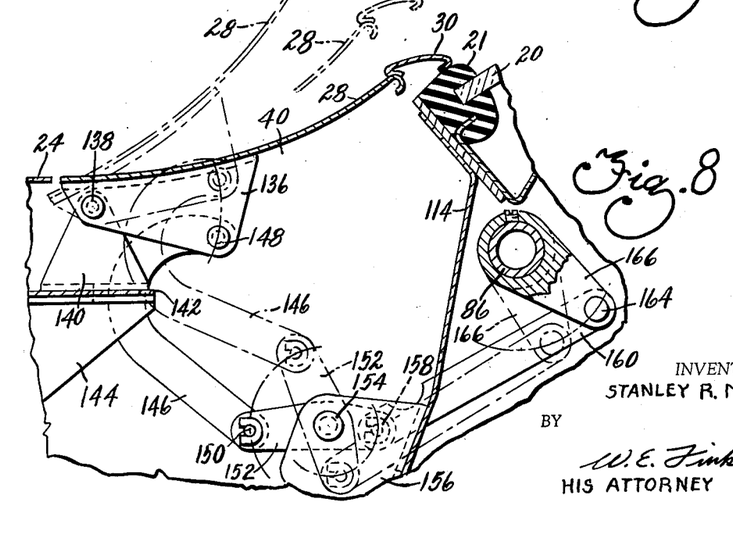
FIGURE 8 is a view similar to FIGURE 6 showing the various positions of the cover actuating mechanism.

As seen in FIGURE 8, the cover 28 is fully closed in which position the section 30 of the lower reveal molding firmly engages the lower rubber molding 21 of the windshield 20. During counterclockwise movement of the pivot rod 86 from the full line position of crank arm 166 in FIGURE 8 to the dotted line position thereof, the outer end of each bellcrank 152 is moved to its maximum throw position thereby fully opening the cover 28. During continued counterclockwise rotation of the crank arms 166 with the pivot rod 86 to its limit position as shown in FIGURE 6, the bellcranks 152 are moved over center and the cover 28 is moved to the partially closed, or operating, position thus minimizing obstruction to vision through the windshield 20. During oscillation of the wiper arm and blade assemblies across the outer surface of the windshield 20, the cover 28 is retained in its partially closed position as shown in FIGURE 6.

Figures 9, 10:
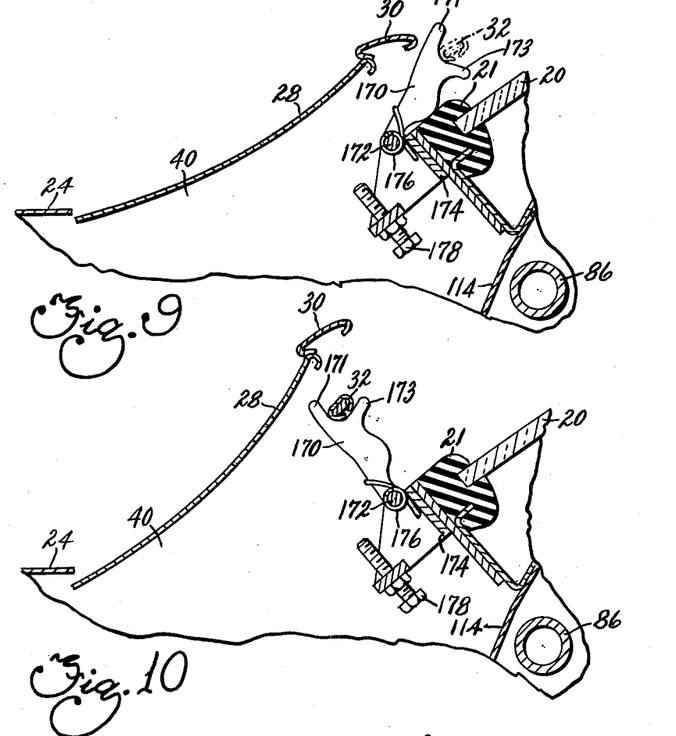

Referring to FIGURES 3a, 3b and 9 through 11, a pair of spaced retainers 170 are pivotally mounted on pins 172 carried by brackets 174 proximate the rubber molding 21. Each pin 172 is encircled by a torsion spring 176, the ends of which engage its respective bracket 174 and the intermediate portion of which extends over its respective retainer 170. The torsion springs 176 are designed to hold the retainers in engagement with the rubber molding 21 as seen in FIGURE 9.

Figure 11:
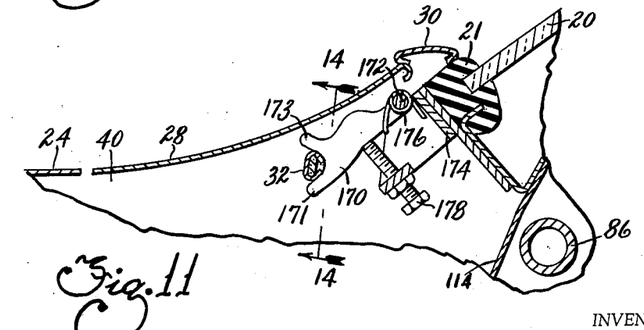
FIGURE 11 is a view similar to FIGURE 9 showing the cover fully closed with the wiper mechanism in its stowed position.

When the wiper blades 34 are parked adjacent their inboard stroke end positions, and thus are substantially horizontally positioned, the wiper arms 32 engage their respective retainers 170. More particularly, each wiper arm 32 is situated in a groove defined by ears 171 and 173 with its respective retainer 170 in the parked position of the wiper blades.

As the pivot rod 86 is rotated from its operating position as shown in full lines in FIGURE 4 to its stowed position as shown in dotted lines in FIGURE 4, the wiper arm and blade assemblies are lifted from engagement with the windshield 20 and moved into the well 40. As the cover 28 is moved to its fully open position, as shown in FIGURE 10, concurrently with forward rotation of the pivot shaft assemblies, the wiper arms 32 effect counterclockwise pivotal movement of the retainers 170 from the position of FIGURE 9 to the position of FIGURE 10. In this manner the wipers 32 are lifted from the windshield 20 and over the rubber molding 21.

As the cover 28 moves from its fully open position of FIGURE 10 to its fully closed position of FIGURE 11, the wiper arms 32 effect a further counterclockwise movement of the retainers 170, against the bias of the torsion springs 176, until the retainers 170 engage adjustable stop screws 178. The wiper arm and blade assemblies are now in their stowed position within the well 40 whereat they are supported by the retainers 170. During movement of the wiper blade and arm assemblies from their stowed position to their operating position, the retainers 170 follow the movement of the wiper arms 32 under the urge of their torsion springs 176 and again lift the wiper arms and blades over the rubber molding 21 of the windshield.

Since the cover actuating linkage is operated by the pivot rod 86, it will be appreciated that movement of the cover between its three positions will be automatically coordinated with movement of the wiper blade and arm assemblies and their pivot shafts between stowed and operating positions. The geometry of the cover actuating linkage is designed to preclude interference between the wiper blade and arm assemblies and their retainers 170 with the cover 28 during movement of the wiper blades and arms into and out of the well.

During rotation of the pivot rod 86 between its limit positions, the vertical distance between the electric motor operated crank assembly 42 and the ball joint connections 90 varies, and since the linkages between the motor driven crank assembly and the pivot shaft assemblies are of fixed length, the pivot shafts will be rotated about their own axes in the inboard direction during movement from their operating position to their stowed position thus assuring secure engagement of the arms 32 with their retainers 170. At the same time the links 92 rotate relative to sleeves 98 to prevent twisting of the linkages which might otherwise overstress the connections between the several components of the transmission assemblies.

Figures 14, 15:
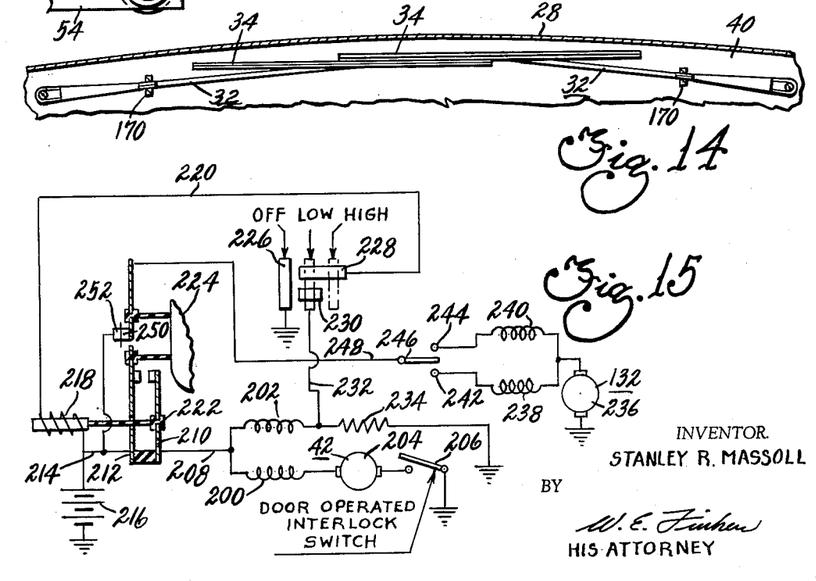
FIGURE 14 is a fragmentary sectional view taken along line 14—14 of FIGURE 11 on a reduced scale.
FIGURE 15 is an electrical schematic of the interlocked energizing circuits of the wiper motor and pivot rod motor.

Referring to FIGURE 15, a suitable control system for the wiper motor and the pivot rod motor will be described. The wiper motor 42 is shown having a series field 200 and a shunt field 202 connected with an armature 204. A cover, or linkage, operated interlock switch 206 is connected in series with the armature 204, the switch 206 being open when the cover 28 is closed, and closed when the cover 28 is in its operating position. The interconnected ends of the series and shunt field windings 202 are connected by a wire 208 to a parking switch contact 210. The parking switch contact 210 is engageable with parking switch contact 212 connected by wire 214 with one terminal of a battery 216. The parking switch contacts 210 and 212 are designed to be closed upon energization of a relay 218 connected to the battery 216, and connected by a wire 220 with a manual wiper control switch. The relay 218 includes a plunger 222 for moving the contact 210 into engagement with the contact 212.

The parking switch contact 212 is designed to be disengaged from the contact 210 by a wiper motor driven cam 224 when the manual wiper switch is open and the wiper blades arrive at their inboard stroke end positions and the relay 218 is deenergized. The manual wiper switch includes movable contact 226 and a pair of stationary contacts 228 and 230. The contact 230 is connected by a wire 232 in the junction of the shunt field winding 202 and a speed controlling resistor 234.

The pivot rod motor 132 is shown having an armature 236 and split series field windings 238 and 240 connected to switch contacts 242 and 244, respectively. A movable contact 246 is connected by a wire 248 to a movable switch contact 250 actuated by the cam 224 driven by the wiper motor. The contact 250 is engageable with a stationary contact 252 connected to the battery 216.

It will be appreciated that the wiper motor 42 is inoperative as long as the cover 28 is closed since switch 206 is open at this time. The energizing circuits for the pivot rod motor 132 can be completed by movement of switch contact 246 into engagement with either contact 242 or 244 through the contacts 252 and 250 which will be closed when the wiper mechanism is parked. Thus, the switch 246 can be manipulated to open the cover and move the wiper mechanism from its stowed position to its operating position, thus effecting closure of switch 206. The wiper switch contact 226 can then be moved to either its low or high position thus energizing relay 218 and wiper motor 42 through the contacts 210 and 212. When the wiper motor 42 is operating, the pivot rod motor 132 cannot be energized since the contacts 250 and 252 are only closed when the wiper motor is parked.

When the wiper operation is no longer required, the manually operated wiper switch is moved to the "off" position. Upon movement of the wiper blades to their parked positions, the contacts 210 and 212 will be separated by cam 224 which will simultaneously close switch contacts 250 and 252. Since the wiper motor 42 is now deenergized, the pivot rod motor 132 can be energized to move the cleaner assemblies to their stowed position and close the cover as shown in FIGURE 14.

While the embodiment of the invention as herein disclosed constitutes a preferred form, it is to be understood that other forms might be adopted.

What is claimed is as follows:

1. In a vehicle, a windshield, a forwardly extending cowl adjacent the lower edge of the windshield, a transversely extending well in said cowl having an access opening therethrough, a transversely extending rotatable rod having spaced end portions disposed in said well, a pivot shaft assembly attached to each end portion of said rod, an oscillatable wiper arm and blade assembly drivingly connected with each pivot shaft, motor means mounted in said vehicle and drivingly connected to said pivot shaft assemblies for imparting conjoint oscillation to said wiper arm and blade assemblies, a cover for said access opening hinged at its forward edge to said vehicle, linkage means interconnecting said cover and said rod, and means for rotating said rod between predetermined positions for effecting coordinated movement of said cover and said wiper arm and blade assemblies between a stowed position wherein said wiper arm and blade assemblies are disposed within said well and said cover is closed, and an operating position wherein said wiper arm and blade assemblies engage said windshield and said cover is open.

2. In a vehicle, a windshield, a forwardly extending cowl adjacent the lower edge of the windshield, a transversely extending well in said cowl having an access opening therethrough, a transversely extending rotatable rod having end portions disposed in said well, a pivot shaft assembly attached to each end portion of said rod, a wiper arm and blade assembly drivingly connected to each pivot shaft, and means for rotating said rod to move said wiper blade and arm assemblies between stowed and operating positions, said wiper blade and arm assemblies being disposed within said well in said stowed position and engaging said windshield in said operating position.

3. In a vehicle having a windshield with a lower molding, a forwardly extending cowl adjacent the lower edge of the windshield and a transversely extending well in said cowl having an access opening therethrough, cleaning mechanism for said windshield comprising a pair of spaced oscillatable wiper arm and blade assemblies, a pair of spaced pivot shaft assemblies for imparting movement to said wiper arm and blade assemblies, means pivotally supporting said pivot shaft assemblies for rotation about an axis extending transversely of said vehicle, means operable to rotate said pivot shaft assemblies about said transverse axis between stowed and operating positions, and a pivotally supported retainer engageable with each wiper arm and blade assembly for lifting the same over the lower molding of said windshield during movement between said operating and stowed positions.

4. Windshield cleaning mechanism for a vehicle having a windshield, a cowl extending forwardly of said windshield and having a transversely extending well therein, an access opening through said cowl and a hinged cover for closing said access opening, comprising, a pair of spaced oscillatable cleaner assemblies, a pivot shaft assembly for each cleaner assembly, means supporting said pivot shaft assemblies for rotation about an axis extending transversely of said vehicle between positions wholly within said well and extending through said access opening, a wiper motor disposed in said vehicle having rotary crank means, linkage means extending between each pivot shaft assembly and said rotary crank means including a pair of parts supported for rotation relative to each other while constrained for reciprocation in unison, and means for rotating said pivot shaft assemblies about said transverse axis to move said cleaner assemblies between an operating position in engagement with the windshield and a stowed position in said well, relative rotation occurring between the two parts of each linkage means during movement of said cleaner assembly between their operating and stowed positions.

5. Windshield cleaning mechanism for a vehicle having a windshield, a cowl having a transversely extending well therein, an access opening through said cowl and a hinged cover for closing said access opening, including, a pair of spaced oscillatable cleaner assemblies, means for imparting conjoint oscillation to said cleaner assemblies across the outer surface of said windshield, and means operable to rotate said cleaner assemblies about an axis extending transversely of said vehicle between an operating position wherein said cleaner assemblies engage said windshield and a stowed position wherein said cleaner assemblies are disposed in said well.

6. Windshield cleaning mechanism for a vehicle having a windshield, a cowl having a transversely extending well therein and an access opening through said cowl and a hinged cover for closing said access opening, including, a pair of oscillatable cleaner assemblies, drive means for imparting conjoint oscillation to said cleaner assemblies across the outer surface of said windshield, means supporting said cleaner assemblies for rotation about an axis extending transversely of said vehicle for movement between an operating position wherein said cleaner assemblies engage said windshield and a stowed position wherein said cleaner assemblies are disposed in said well, and coordinated means for moving said cleaner assemblies between their operating and stowed positions and concurrently actuating said cover between its open and closed positions.

7. Windshield cleaning mechanism for a vehicle having a windshield, a cowl having a transversely extending well therein, an access opening through said cowl and a hinged cover for closing said access opening, including, a pair of oscillatable cleaner assemblies, drive means for imparting conjoint oscillation to said cleaner assemblies between predetermined inboard and outboard stroke end limit positions including means for arresting movement of said cleaner assemblies adjacent their inboard stroke end limit positions, a pair of retainers pivotally mounted on said vehicle and engageable with said cleaner assemblies adjacent their inboard stroke end positions, and means for rotating said cleaner assemblies about an axis extending transversely of said vehicle between an operating position wherein said cleaner assemblies engage said windshield and a stowed position wherein said cleaner assemblies are disposed in said well, said retainers supporting said cleaner assemblies during movement thereof between said operating and stowed positions and also supporting said cleaner assemblies in their stowed positions.

8. Windshield cleaning mechanism for a vehicle having a windshield, a cowl having a transversely extending well therein, an access opening through said cowl and a hinged cover for closing said access opening, including, a pair of oscillatable cleaner assemblies, drive means for imparting conjoint oscillation to said cleaner assemblies between predetermined inboard and outboard stroke end limit positions including means for arresting movement of said cleaner assemblies adjacent their inboard stroke end limit positions, a pair of retainers pivotally mounted on said vehicle and engageable with said cleaner assemblies adjacent their inboard stroke end positions, means supporting said cleaner assemblies for rotation about an axis extending transversely of said vehicle for movement between operating and stowed positions, and coordinated means for moving said cleaner assemblies between their operating and stowed positions and concurrently actuating said cover between its open and closed positions, said retainers supporting said cleaner assemblies during movement thereof between said operating and stowed positions and also supporting said cleaner assemblies in their stowed positions.

9. The windshield cleaning mechanism set forth in claim 8 wherein said cover is hinged along its forward edge and wherein the means for actuating said cover retains said cover in a partially open position when the cleaner assemblies are in their operating position and moves said cover to a fully open position during movement of said cleaner assemblies between their operating and stowed positions.

10. The windshield cleaning mechanism set forth in claim 9 wherein the means for actuating said cover comprises rotatable crank means and a link, said rotatable crank means being movable over center to fully open said cover during movement of said cleaner assemblies between their operating and stowed positions.

11. The windshield cleaning mechanism set forth in claim 8 wherein said windshield has a molding at its lower edge, and wherein said retainers lift said cleaner assemblies over said molding during movement between their operating and stowed positions.

12. The windshield cleaning mechanism set forth in claim 11 wherein said retainers are mounted on pins, and wherein said pins are encircled by torsion springs for holding said retainers in position to receive said cleaner assemblies.

13. The windshield cleaning mechanism set forth in claim 12 wherein said cleaner assemblies comprise a pair of wiper arms and a pair of wiper blades, and wherein each wiper arm comprises spring hinge connected inner and outer sections, the outer sections of said arms being engageable with said retainers.

14. Windshield cleaning mechanism for a vehicle having a windshield, a cowl having a transversely extending well therein and an access opening through said cowl, including, a cover hinged along its forward edge for closing said access opening, a pair of spaced oscillatable cleaner assemblies, means for imparting conjoint oscillation to said cleaner assemblies across the outer surface of said windshield, means supporting said cleaner assemblies for rotation about an axis extending transversely of said vehicle for movement between an operating position wherein said cleaner assemblies engage said windshield and a stowed position wherein said cleaner assemblies are disposed in said well, and coordinated means for moving said cleaner assemblies between their operating and stowed positions and concurrently actuating said cover between its open and closed positions, said coordinated means retaining said cover in a partially open position when the cleaner assemblies are in their operating position and moving said cover to a fully open position during movement of said cleaner assemblies between their operating and stowed positions.

15. Windshield cleaning mechanism for a vehicle having a windshield, a cowl having a transversely extending well therein, and an access opening through said cowl including, a pair of spaced oscillatable cleaner assemblies, means for imparting conjoint oscillation to said cleaner assemblies across the outer surface of said windshield, means operable to rotate said cleaner assemblies about an axis extending transversely of said vehicle between an operating position wherein said cleaner assemblies engage said windshield and a stowed position wherein said cleaner assemblies are disposed in said well, and means operable to support said cleaner assemblies during movement thereof between their operating and stowed positions.

References Cited in the file of this patent
UNITED STATES PATENTS
2,895,157     Kocourek _____________ July 21, 1959